United States Patent
Spoelstra et al.

(10) Patent No.: US 12,496,158 B2
(45) Date of Patent: Dec. 16, 2025

(54) SYSTEMS INCLUDING A WIRELESS REMOTE AND TRAY

(71) Applicant: Alcon Inc., Fribourg (CH)

(72) Inventors: Brandon L. Spoelstra, Trabuco Canyon, CA (US); Andrew Mason Hahn, Anaheim, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 18/810,835

(22) Filed: Aug. 21, 2024

(65) Prior Publication Data
US 2025/0072989 A1 Mar. 6, 2025

Related U.S. Application Data

(60) Provisional application No. 63/579,577, filed on Aug. 30, 2023.

(51) Int. Cl.
*A61B 50/20* (2016.01)
*A61B 17/00* (2006.01)

(52) U.S. Cl.
CPC ........... *A61B 50/20* (2016.02); *A61B 17/00* (2013.01); *A61B 2017/00199* (2013.01); *A61B 2017/00212* (2013.01); *A61B 2050/21* (2016.02)

(58) Field of Classification Search
CPC ..... A61B 50/20; A61B 17/00; A61B 2050/21; A61B 2017/00199; A61B 2017/00212
USPC .................................................. 206/363, 557
See application file for complete search history.

(56) References Cited

U.S. PATENT DOCUMENTS

| | | | |
|---|---|---|---|
| 5,005,590 A * | 4/1991 | Eldridge, Jr. | A61B 50/33 206/370 |
| 5,954,208 A | 9/1999 | Schultz | |
| 6,065,596 A * | 5/2000 | Cavanagh | A61B 50/20 206/363 |
| 6,305,656 B1 | 10/2001 | Wemyss | |
| 6,543,983 B1 * | 4/2003 | Felder | B23Q 7/1442 414/389 |
| 6,736,360 B1 | 5/2004 | Buczek | |
| 7,461,825 B2 | 12/2008 | Olivera et al. | |
| 9,526,580 B2 | 12/2016 | Humayun et al. | |
| 10,843,638 B2 | 11/2020 | Erdtmann et al. | |
| 11,955,305 B1 | 4/2024 | Snyder et al. | |
| 2004/0144673 A1 | 7/2004 | Buczek | |
| 2010/0223857 A1* | 9/2010 | Sutton | A47B 96/00 52/27 |
| 2011/0121049 A1 | 5/2011 | Malinouskas et al. | |
| 2014/0034586 A1 | 2/2014 | Eaton | |
| 2014/0299739 A1 | 10/2014 | Bradow | |

(Continued)

FOREIGN PATENT DOCUMENTS

| | | |
|---|---|---|
| CN | 201774768 U | 3/2011 |
| CN | 216291718 U | 4/2022 |

(Continued)

*Primary Examiner* — Jacob K Ackun
(74) *Attorney, Agent, or Firm* — Patterson + Sheridan, LLP

(57) ABSTRACT

Described herein is a system for surgical procedures. The system can include a tray and a wireless remote. The tray may include a magnetically attractive layer. The wireless remote is configured to control one or more aspects associated with operations of a surgical console and includes one or more magnets configured to magnetically interact with the magnetically attractive layer and couple the wireless remote to the tray.

15 Claims, 10 Drawing Sheets

(56) References Cited

U.S. PATENT DOCUMENTS

| | | | |
|---|---|---|---|
| 2014/0346068 A1* | 11/2014 | Omura | B65D 25/06 |
| | | | 206/534 |
| 2015/0105782 A1* | 4/2015 | D'Lima | A61B 17/155 |
| | | | 606/90 |
| 2015/0144514 A1* | 5/2015 | Brennan | A61B 90/50 |
| | | | 206/363 |
| 2019/0219893 A1 | 7/2019 | Overall et al. | |

FOREIGN PATENT DOCUMENTS

| CN | 116098714 A | 5/2023 |
|---|---|---|
| WO | 2012029049 A2 | 3/2012 |
| WO | 2018013413 A1 | 1/2018 |
| WO | 2021028765 A1 | 2/2021 |

* cited by examiner

SYSTEMS INCLUDING A WIRELESS REMOTE AND TRAY

CROSS-REFERENCE TO RELATED APPLICATIONS

This application claims benefit of and priority to U.S. Provisional Patent Application No. 63/579,577, filed on Aug. 30, 2023. The entire contents of this application are incorporated herein by reference.

INTRODUCTION

In many types of medical settings, a healthcare professional will use an array of instruments to perform delicate procedures on a patient. These instruments, together with certain supplies and consumables, are typically placed on a tray located both near the patient and within easy reach of the healthcare professional. Most people who have ever visited a dentist are familiar with the tray used by a dental hygienist or a dentist when performing either cleaning or more complex dental procedures on their teeth. The tray is positioned near the patient's head so that those items needed to complete the dental procedure are in easy reach of the healthcare professional.

Trays similar to those used by dentists are also used in surgical settings, including operating rooms for ophthalmic surgery. During an ophthalmic surgical procedure, the surgeon is typically positioned near/over the head of the patient to enable easy access to the patient's eyes. The surgeon may use a variety of different instruments, supplies, and consumables during the procedure. These instruments, supplies, and consumables are typically placed within easy reach of the surgeon on a tray that may be further coupled to a surgical console.

The instruments placed on the tray during an ophthalmic surgical procedure may include a remote control device configured to control one or more aspects of the surgical console. The remote may be placed on the tray by a user, such as a surgeon, and covered with a surgical drape for sanitization purposes during the ophthalmic procedure. However, in certain cases, a user may accidentally contact the remote during the procedure, which may cause the remote to transmit unwanted outputs or even flip over, thereby making it more difficult to use. Further, when the surgical drape is removed and discarded after the procedure, the remote may accidentally be discarded with the surgical drape. In such cases, the remote may then need to be replaced.

SUMMARY

The present disclosure generally relates to systems and apparatuses for ophthalmic surgical procedures.

In certain embodiments, a system is provided. The system comprises a tray comprising a magnetically attractive layer, and a wireless remote configured to control one or more aspects associated with operations of a surgical console, the wireless remote comprising one or more magnets configured to magnetically interact with the magnetically attractive layer and couple the wireless remote to the tray.

In certain embodiments, a surgical console is provided. The surgical console comprises a tray comprising a magnetically attractive layer, and a wireless remote configured to control one or more aspects associated with operations of a surgical console. The wireless remote comprises one or more magnets in one or more receptacles, wherein the one or more magnets are configured to magnetically interact with the magnetically attractive layer and couple the wireless remote to the tray, and one or more elastomeric pads aligned with the one or more magnets, wherein the one or more elastomeric pads are configured to maintain positioning of the wireless remote on the tray.

BRIEF DESCRIPTION OF THE DRAWINGS

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

It will be readily understood that the components of the embodiments as generally described herein and illustrated in the appended Figures can be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in the Figures, the Figures are not necessarily drawn to scale unless specifically indicated.

Figure 1:
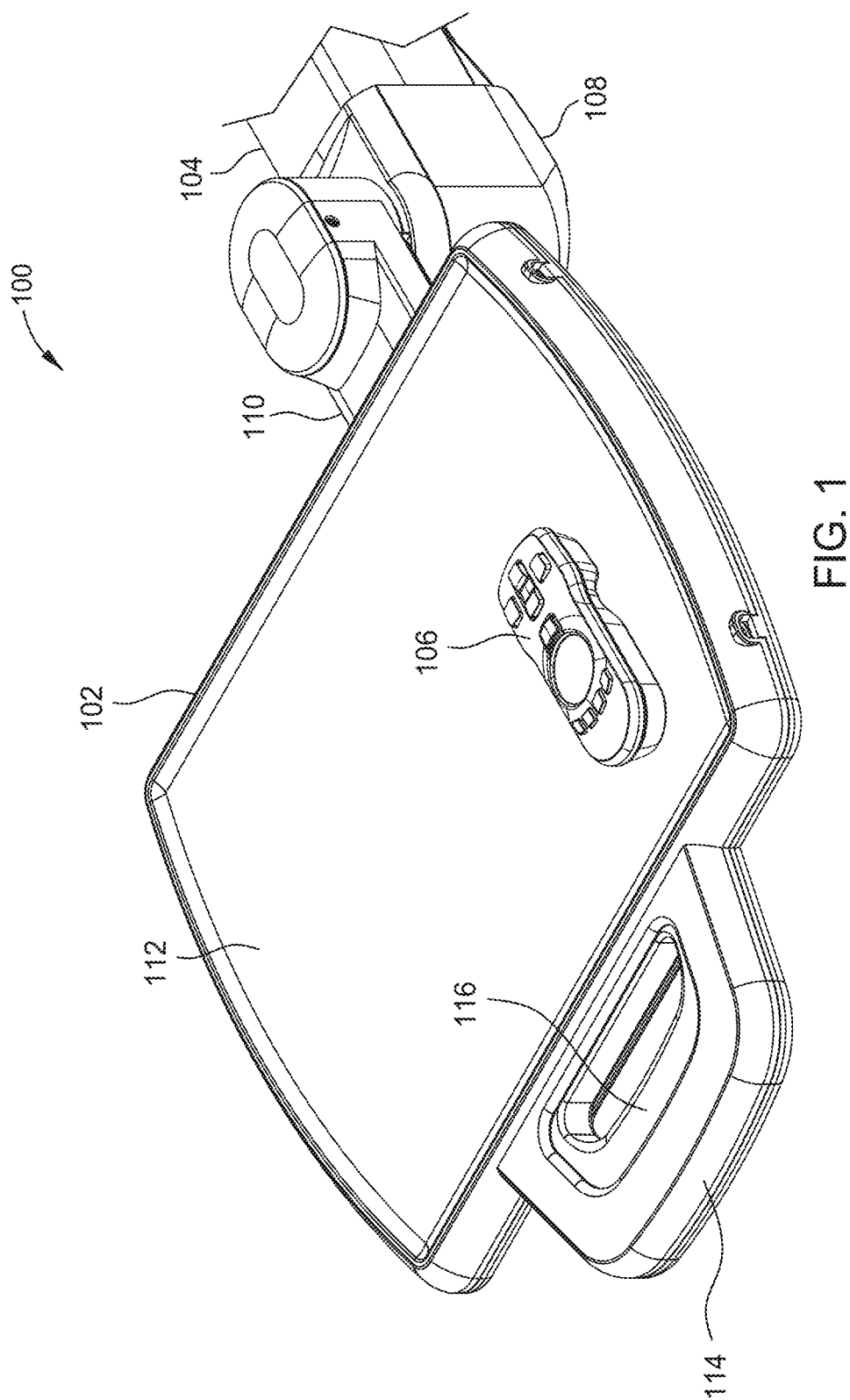
FIG. 1 is a top side isometric view illustrating an example tray arm assembly, according to certain embodiments.

FIG. 1 is a top side isometric view illustrating an example tray arm assembly 100, according to certain embodiments. The tray arm assembly 100 is constructed to be an integral part of a surgical console. As shown, tray arm assembly 100 comprises an upper arm assembly 104, an elbow joint 108, a forearm assembly 110, a tray joint, a tray 102, a tray positioning handle 114, and a release handle 116. The tray arm assembly 100 may also include a shoulder joint and a mount for connecting the tray arm assembly 100 to the surgical console. The tray 102 includes an instrument surface 112 with the capacity to hold instruments, equipment, supplies, and any consumables required for a surgical procedure, in addition to any associated cables and tubes.

The elbow joint 108, the shoulder joint, and the tray joint are configured to allow the tray 102 to be positioned (e.g., moved or rotated) with respect to the console. Also, one or more (e.g., each) of the elbow joint 108, the shoulder joint, and the tray joint comprise a two-tier friction mechanism. The two-tier friction mechanism comprises a first friction mechanism and a second friction mechanism. If activated, the first friction mechanism prevents any movement in the corresponding joint unless enough torque is applied to the joint to overcome the friction associated with the first friction mechanism. In other words, when the first friction mechanism is activated in all the joints, a user is not able to move or rotate the tray arm assembly 100 relative to the console unless the user applies enough torque to overcome the first friction mechanism in one or more of the joints. Once enough torque is applied to a joint and the first friction mechanism is overcome, the corresponding components that are coupled to the joint can be moved or rotated relative to the console.

By grabbing and pulling the release handle 116, a user is able to deactivate the first friction mechanism in every joint with a first friction mechanism in order to position the tray 102 with respect to the console. However, even with the first friction mechanism de-activated, each joint is still subject to a second friction mechanism, which is always active in the joint. The second friction mechanism subjects each joint to a drag torque, which prevents the whipping of the tray arm assembly 100 relative to the console. Drag torque is exerted in each joint by the second friction mechanism in the opposite direction of torque applied to the joint. Note that applying torque to a joint herein may include applying torque to one or more of the components that are coupled to the joint. For example, applying torque to the elbow joint 108 includes or can be caused by applying torque to the forearm assembly 110 and the upper arm assembly 104. In another example, applying torque to the shoulder joint includes applying torque to the forearm assembly 110 and the console.

By releasing the release handle 116, a user is able to re-activate the first friction mechanism in the joints. When the first friction mechanism is activated, an application of force to one or more components of the tray arm assembly 100 does not cause any movement or rotation in the tray arm assembly 100 relative to the console, unless such a force results in torque exceeding a threshold amount of torque required to overcome the first friction mechanism in one or more of the joints. As such, when the first friction mechanism is activated in the joints, a user is able to grab tray positioning the handle 114 and move the console by pushing and pulling the handle 114 or any other part of the tray 102, the upper arm assembly 104, the forearm assembly 110, etc.

The first friction mechanism also ensures that tray arm assembly 100 joints are not damaged as a result of excessive torque applied thereto. This is because, in response to excessive torque, the first friction mechanism is overcome in a joint, allowing for movement or rotation. This is unlike certain prior art tray arm assemblies whose components are not configured to move regardless of how much force is applied thereto. With such prior art tray arm assemblies, a user may apply excessive torque on one or more of the joints, with the intention of, for example, rotating the tray relative to console, which may cause damage to such joints.

Note that the tray arm assembly 100 described herein is entirely mechanical, however, those of ordinary skill in the art will understand that in an alternate embodiment, one or more powered actuators may be used to move the components, including the arm assemblies and joints of tray arm assembly 100.

In certain embodiments, the tray arm assembly 100, in addition to the other equipment, is configured to support a wireless remote 106 configured to control one or more aspects of the surgical console. As an example, the wireless remote 106 may be placed on the tray 102 by a user before a surgical procedure and covered with a transparent or translucent surgical drape to maintain a sterile field and prevent contamination by the remote (or tray 102). The wireless remote 106 may then be manipulated by a user to control aspects of the surgical console during the surgical procedure.

However, during surgical procedures, unwanted movement of the wireless remote 106 may occur when the wireless remote 106 is manipulated by the user. For example, the wireless remote 106 may slide, fall on its side, or flip over when the tray 102 is moved or when the user makes accidental contact with the wireless remote 106. Consequently, unwanted movement of the wireless remote 106 can have negative implications during surgical procedures. For example, such movement can make it difficult for a user to locate and/or manipulate one or more toggles or buttons on the wireless remote 106, thereby impeding the performance of the surgical procedure. Further, such movement can cause toggles or buttons on the wireless remote 106 to be unintentionally manipulated, which can cause the surgical console to unintentionally perform certain functions.

Additionally, after surgery, when the surgical drape is removed and discarded during cleanup, the wireless remote 106 may be caught in, or picked up by, the surgical drape and accidentally thrown away with the surgical drape. The wireless remote 106 may then need to be replaced, which creates an unnecessary expense.

The embodiments described herein provide a surgical system that includes a wireless remote that magnetically couples to a tray for use during ophthalmic procedures. Magnetically coupling the wireless remote and the tray allows for the wireless remote to remain at a user-determined location and/or prevents the wireless remote from accidentally sliding around on the tray.

The wireless remote and tray described herein provide improved stability and flexibility during surgical procedures as compared to conventional systems. For example, the wireless remote may be placed in any user-desired location and orientation on the tray and is not limited to a predetermined and fixed location thereon. Further, once placed in a desired location by the user, the wireless remote, as facilitated by the magnets and elastomeric pads of the remote and the magnetically attractive layer of the tray, will remain in place until the user actively moves the remote. In other words, the wireless remote is less prone to unintentional and incidental movement. Thus, the user may be able to place and manipulate other instruments and/or devices on the tray, and carry out operations of the surgical procedure, without concern of accidentally moving the wireless remote.

An example embodiment of a wireless remote is described in further detail with reference to FIGS. 2A-2C.

Figure 2A:
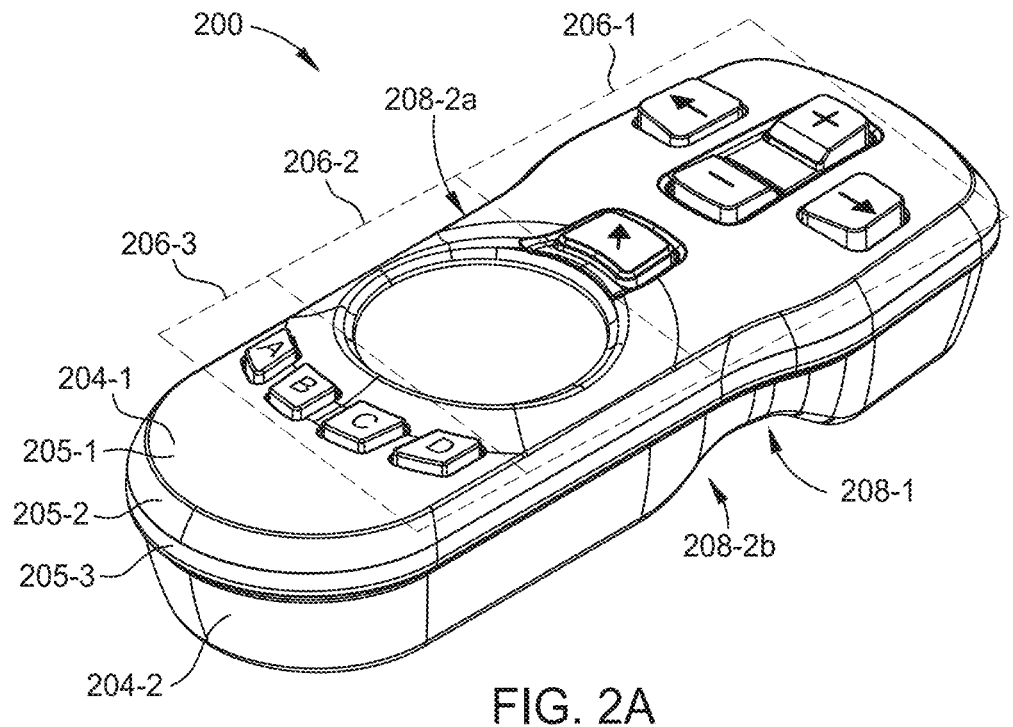
FIG. 2A is a top side isometric view illustrating an example wireless remote, according to certain embodiments.

FIG. 2A is a top side isometric view illustrating an example wireless remote 200, according to certain embodiments. The wireless remote 200 includes a housing having an upper housing 204-1 and a lower housing 204-2, a plurality of input sets including a first input set 206-1, a second input set 206-2, and a third input set 206-3.

In certain embodiments, the upper housing 204-1 includes a first surface 205-1 (top surface 205-1) with one or more apertures (best seen in FIG. 3A) corresponding to the plurality of input sets 206-1, 206-2, and 206-3 which are disposed therethrough. In some embodiments, the upper housing 204-1 also includes a second surface 205-2 (tapered surface 205-2) connecting the first surface 205-1 to a third surface 205-3 (outer perimeter surface 205-3). The second surface may be tapered, such that the second surface 205-2 forms an angle with the top surface 205-1 and the outer perimeter surface 205-3. The tapered surface 205-2 may help improve grip of the wireless remote 200 when held by a user, and prevent the wireless remote 200 from slipping or being dropped. In some embodiments, the outer perimeter surface 205-3 forms part of a left side gripping portion 208-2a and part of a right side gripping portion 208-2b.

As shown, the lower housing 204-2 is coupled to the upper housing 204-1. Although the lower housing 204-2 is described in further detail with reference to FIG. 2B, the lower housing 204-2 is shown in FIG. 2A as including an underside gripping portion 208-1 and part of the right-side gripping portion 208-2b.

In certain embodiments, the plurality of input sets 206-1, 206-2, and 206-3 are configured to control one or more aspects of a surgical device during a surgical procedure. The plurality of input sets 206-1, 206-2, and 206-3 are described in further detail with reference to FIG. 2C.

Figure 2B:
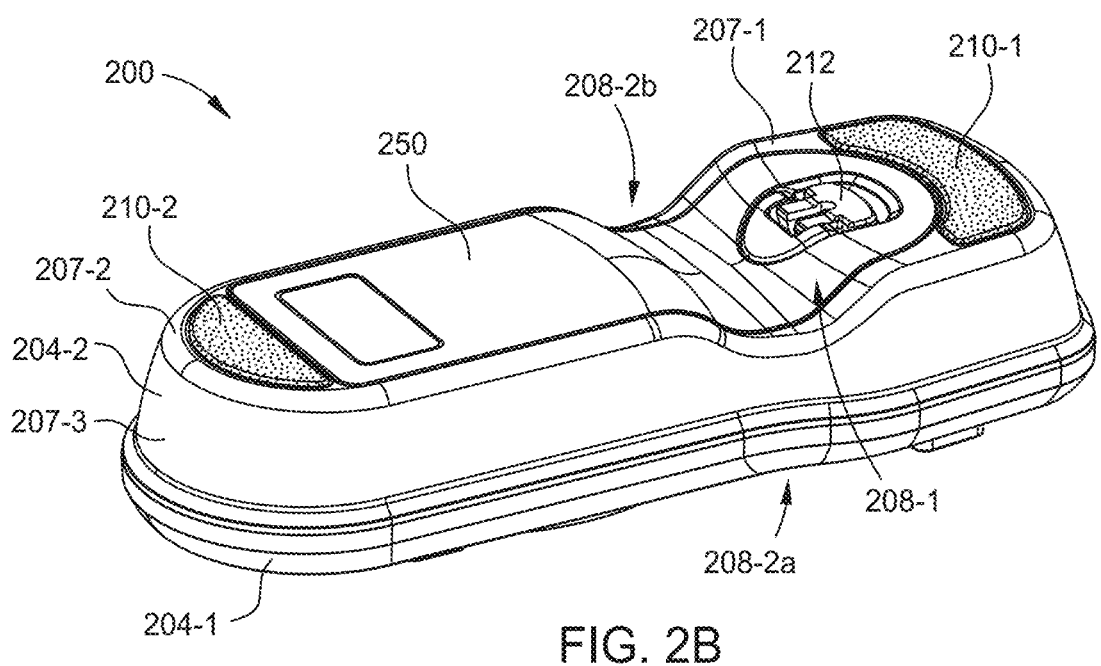
FIG. 2B is a bottom side isometric view illustrating the wireless remote seen in FIG. 2A, according to some embodiments.

FIG. 2B is a bottom side perspective view illustrating the wireless remote 200 seen in FIG. 2A, according to certain embodiments. As shown in FIG. 2B, the wireless remote 200 includes a plurality of elastomeric pads, a first elastomeric pad 210-1 and a second elastomeric pad 210-2, and a fastener 212 on the lower housing 204-2.

In certain embodiments, the lower housing 204-2 includes a first surface 207-1 (bottom surface 207-1) with one or more recessed portions corresponding to the plurality of elastomeric pads 210-1 and 210-2 disposed thereon. In some embodiments, the lower housing 204-2 also includes a second surface 207-2 (rounded surface 207-2) connecting the first surface 207-1 to a third surface 207-3 (outer perimeter surface 207-3). The second surface may be rounded, such that the second surface 207-2 forms a curve between the bottom surface 207-1 and the outer perimeter surface 207-3. The rounded surface 207-2 may help improve grip of the wireless remote 200 when held by a user and prevent the wireless remote 200 from slipping or being dropped. In some embodiments, the outer perimeter surface 207-3 forms the underside gripping portion 208-1, part of the left side gripping portion 208-2a, and part of the right side gripping portion 208-2b.

In certain embodiments, the elastomeric pads 210-1 and 210-2 are configured to maintain positioning of the wireless remote 200 on a tray (e.g., tray 400 in FIG. 4) at any user-determined (e.g., user-placed) location by providing increased friction against the tray. In some embodiments, the elastomeric pads 210-1 and 210-2 are positioned to correspond with a location of one or more magnets disposed within the wireless remote 200. As an example, the first elastomeric pad 210-1 is at a first end of the bottom surface 207-1 and the second elastomeric pad 210-2 is at a second end of the bottom surface 207-1.

In certain embodiments, the elastomeric pads 210-1 and 210-2 are molded onto the lower housing 204-2 with a secondary co-molding process. As an example, the elastomeric pads 210-1 and 210-2 may be comprised of a thermoplastic elastomer (TPE) material or other suitable elastomeric material. The elastomeric pads 210-1 and 210-2 are described in further detail with reference to FIG. 3F.

In certain embodiments, the fastener 212 is configured to couple a battery cover 250 to the lower housing 204-2. Examples of the fastener 212 may include a latch, a pin, a screw, or other suitable fastening mechanism. In some embodiments, the fastener 212 is positioned on the bottom surface 207-1 near a center portion of the bottom surface 207-1. As an example, the fastener 212 may be adjacent to the underside gripping portion 208-1.

In certain embodiments, the battery cover 250 is configured to protect and cover batteries disposed within the wireless remote 200. As an example, the battery cover 250 may align with a curvature of the lower housing 204-2, such that an exterior surface of the battery cover 250 is flush with the bottom surface 207-1 of the lower housing 204-2.

Figure 2C:
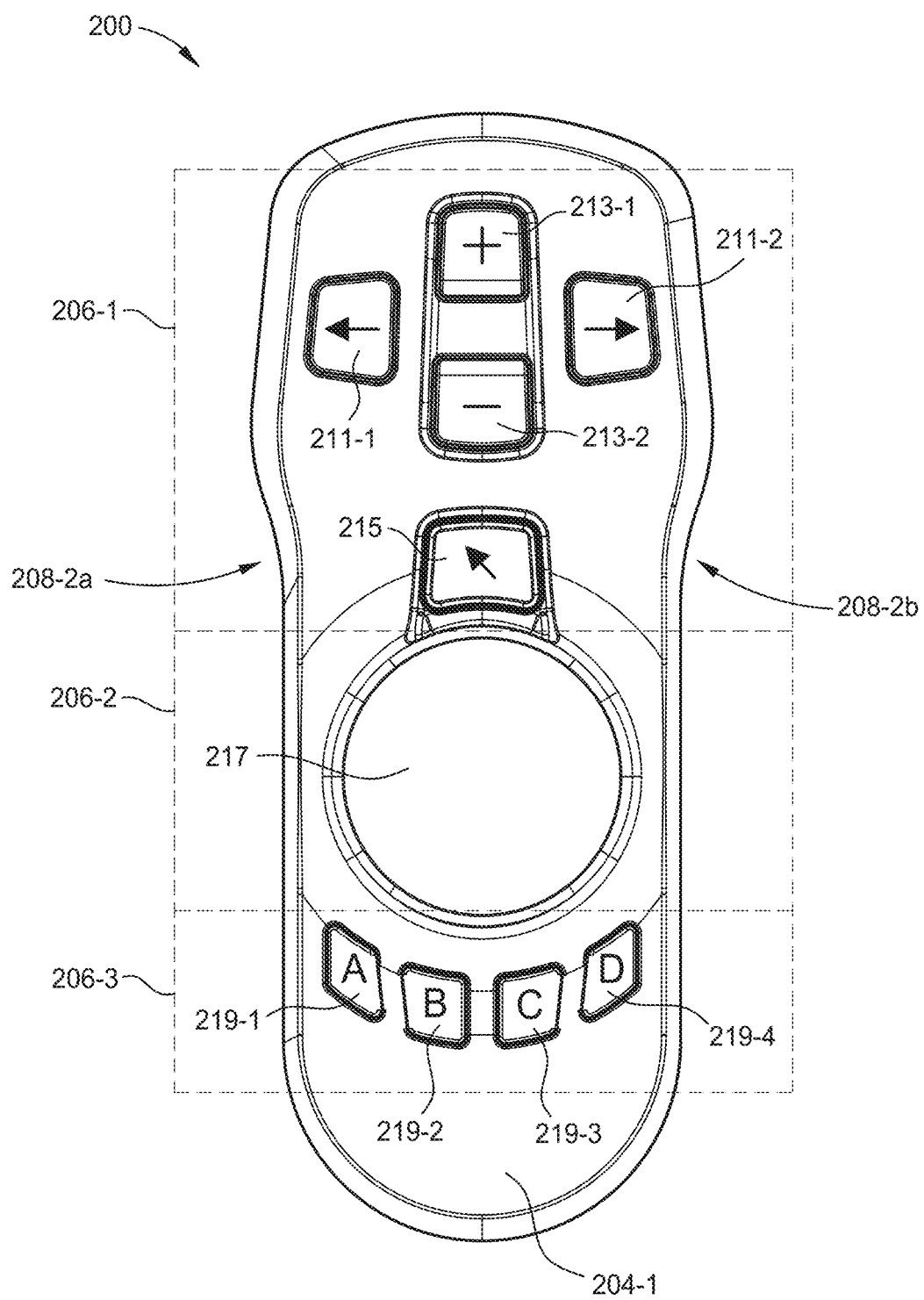
FIG. 2C is a bottom down view illustrating the wireless remote seen in FIG. 2A, according to some embodiments.

FIG. 2C is a bottom down view illustrating the wireless remote 200 seen in FIG. 2A, according to certain embodiments. As shown in FIG. 2C, the wireless remote 200 includes the first input set 206-1, the second input set 206-2, the third input set 206-3.

In specific embodiments, the first input set 206-1 includes a back button 211-1, a forward button 211-2, a plus button 213-1, a minus button 213-2, and a cursor button 215. The first input set may also include a power button. In certain embodiments, the second input set 206-2 includes a trackpad 217. In certain embodiments, the third input set 206-3 includes a plurality of preset buttons, a first preset button 219-1, a second preset button 219-2, a third preset button 219-3, and a fourth preset button 219-4.

In some embodiments, there may be more or less inputs in one or more of the input sets 206-1, 206-2, and 206-3. Further, although the wireless remote 200 is shown as including a plurality of input sets 206-1, 206-2, and 206-3 with buttons and a trackpad, one or more of the inputs of the plurality of input sets 206-1, 206-2, and/or 206-3 may include a gyroscope, a touchscreen, a switch, a scroll wheel, and/or other similar input mechanism. The wireless remote 200 may also have more or less than two gripping portions (e.g., left side gripping portion 208-2a and right side gripping portion 208-2b).

An exploded view and various isometric views of different components of the wireless remote 200 are described in further detail with reference to FIGS. 3A-3F.

Figure 3A:
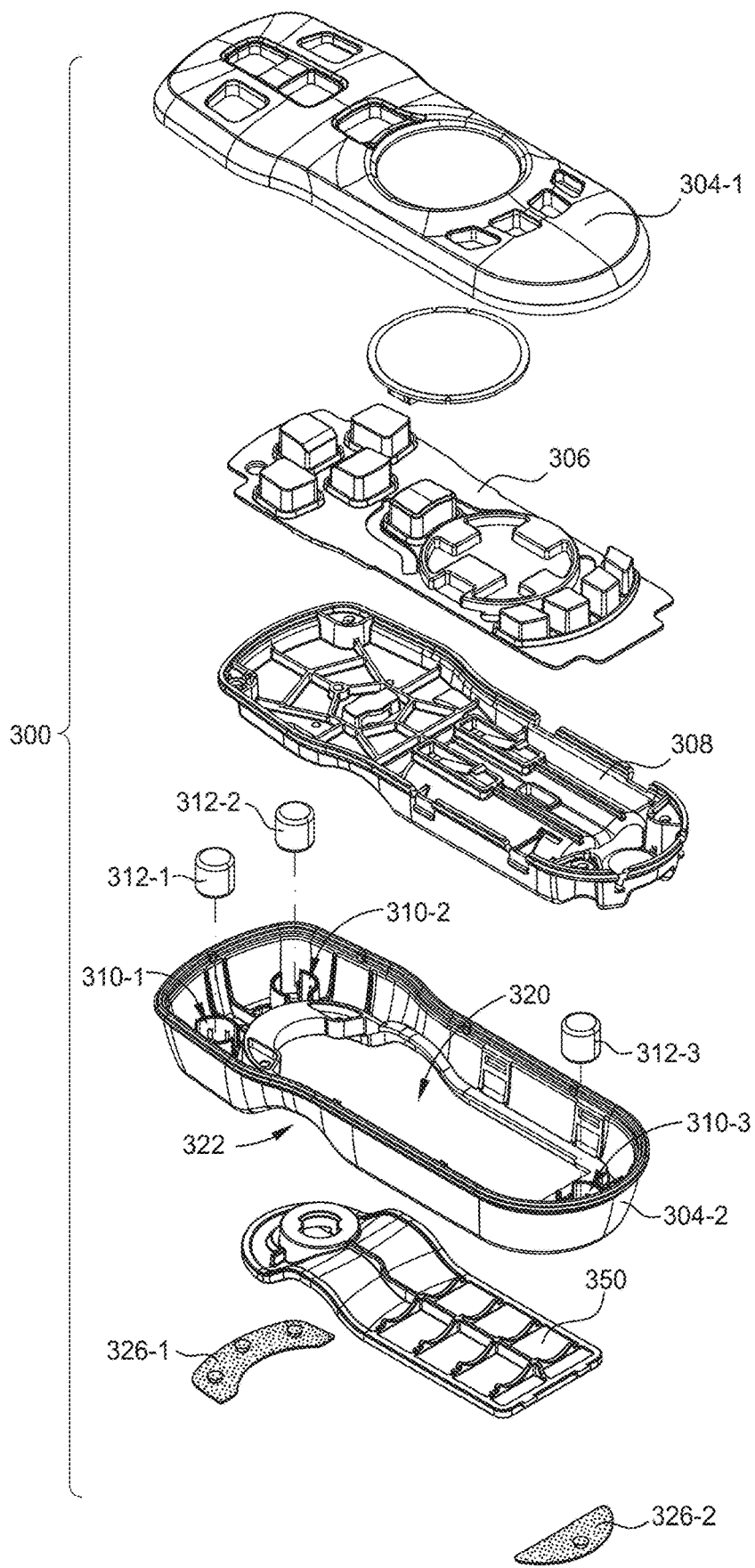
FIG. 3A is an exploded isometric view of the wireless remote seen in FIGS. 2A-2C, according to certain embodiments.

FIG. 3A is an exploded isometric view of a wireless remote 300, according to certain embodiments. The wireless remote 300 represents an embodiment of the wireless remote 200 shown in FIGS. 2A-2C. In FIG. 3A, the wireless remote 300 includes an upper housing 304-1, a lower housing 304-2, a battery cover 350, and a plurality of elastomeric pads, a first elastomeric pad 326-1 and a second elastomeric pad 326-2, as described with reference to FIGS. 2A-2C. The wireless remote 300 also includes an input layer (or membrane) 306 and an inner housing 308.

In certain embodiments, the upper housing 304-1 includes a plurality of apertures corresponding to a plurality of input sets on the input layer 306. For example, the plurality of apertures may align with the plurality of input sets such that the plurality of input sets protrude through the plurality of apertures in the upper housing 304-1.

In certain embodiments, the plurality of input sets may be formed on the input layer 306. For example, the input layer 306 may include an elastomeric keypad membrane having the first input set 206-1, the second input set 206-2, and the third input set 206-3 formed thereon, as described with reference to FIG. 2C. In some embodiments, the plurality of input sets and/or the input layer 306 may be coupled to a printed circuit board (PCB) disposed in the inner housing 308.

In certain embodiments, the inner housing 308 is configured to support the input layer 306 within the wireless remote 300. For example, the inner housing 308 includes one or more protrusions that are disposed through and/or around the input layer 306. In some embodiments, the one or more protrusions may extend into the upper housing 304-1 to dispose the input layer 306 against an inner surface of the upper housing 304-1. For example, the inner housing 308 may include a plurality of pins, slots, and/or other similar features that couple the inner housing 308 to the upper housing 304-1.

In certain embodiments, the lower housing 304-2 is configured to couple and/or support the inner housing 308 and the input layer 306, such that the inner housing 308 and the input layer 306 are disposed against the upper housing 304-1. For example, the lower housing 304-2 may include one or more protrusions that are disposed through and/or around the inner housing 308. In some embodiments, the one or more protrusions may extend into the upper housing 304-1 to fix the inner housing 308 and the input layer 306 against an inner surface of the upper housing 304-1.

In certain embodiments, a plurality of magnets including a first magnet 312-1, a second magnet 312-2, and a third magnet 312-3 are disposed within a plurality of corresponding receptacles 310-1, 310-2, and 310-3 (best seen in FIG. 3B) in an inner portion 320 of the lower housing 304-2. The magnets 312-1, 312-2, and 312-3 are configured to magnetically couple the wireless remote 300 to a tray (e.g., tray 400 in FIG. 4). As an example, the magnets 312-1, 312-2, and 312-3 may be neodymium magnets. In certain embodiments, the magnets 312-1, 312-2, and 312-3 may be cylindrical and have a minimum diameter of 9.53 millimeters (mm) and a minimum height of 9.53 mm. In some embodiments, the magnets may be rectangular and/or have different dimensions. In some embodiments, there may be more than three or less than three magnets. In some embodiments, three or more magnets may provide increased stability. The magnets are described in further detail with reference to FIG. 3E.

In certain embodiments, the battery cover 350 may be coupled to the lower housing 304-2 and/or the inner housing 308. As an example, the battery cover 350 may protect and cover batteries disposed within the inner housing 308.

In certain embodiments, a plurality of elastomeric pads including a first elastomeric pad 326-1 and a second elastomeric pad 326-2 may be disposed on an exterior surface 322 of the lower housing 304-2. Although described as a plurality of elastomeric pads, the elastomeric pads 326-1 and 326-2 may be part of one over-molded piece, such that the first elastomeric pad 326-1 and the second elastomeric pad 326-2 are connected by a thin line of elastomeric material that is disposed through the lower housing 304-2. The elastomeric pads 326-1 and 326-2 are described in further detail with reference to FIG. 3F.

Figure 3C:
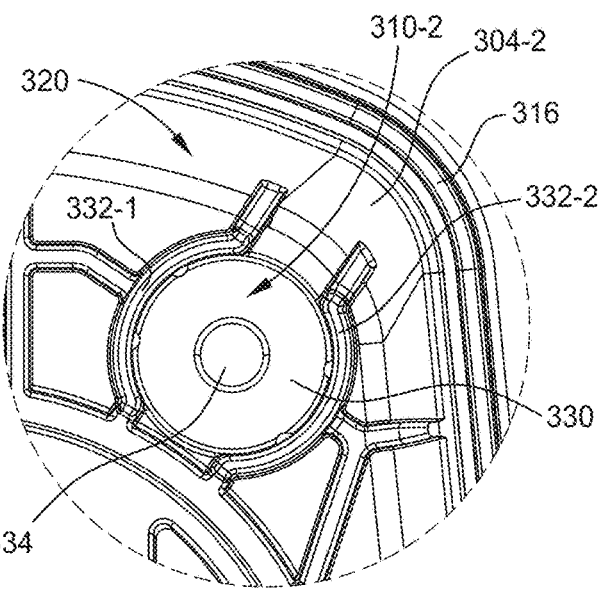
FIG. 3C is an enlarged view illustrating a receptacle of the lower housing seen in FIG. 3B, according to certain embodiments.
Figure 3B:
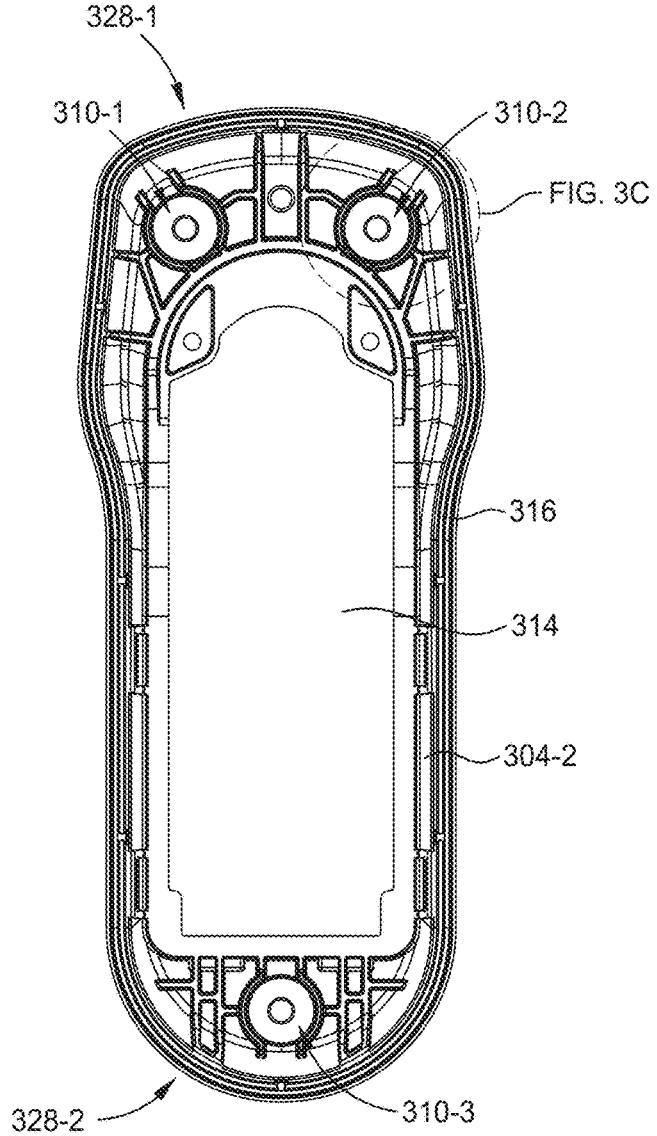
FIG. 3B is a bottom down view illustrating a lower housing of the wireless remote seen in FIG. 3A, according to certain embodiments.

FIG. 3B is a bottom down view illustrating the lower housing 304-2 of the wireless remote 300 seen in FIG. 3A, according to certain embodiments. In FIG. 3B, the lower housing 304-2 includes a plurality of receptacles including a first receptacle, 310-1, a second receptacle 310-2, and a third receptacle 310-3, an inner opening 314, and an outer rim 316.

In certain embodiments, the receptacles 310-1, 310-2, and 310-3 are arranged in a triangular arrangement within the wireless remote 300. For example, the first receptacle 310-1 and the second receptacle 310-2 are positioned at a first end 328-1 of the lower housing 304-2, and the third receptacle 310-3 is positioned at a second end 328-2 of the lower housing 304-2. In such an example, the first receptacle 310-1 and the second receptacle 310-2 are horizontally aligned at the first end 328-1, and the third receptacle 310-3 is aligned equally between the first receptacle 310-1 and the second receptacle 310-2 at the second end 328-2. However, any suitable number and/or arrangement of the receptacles 310-1, 310-2, and 310-3 is contemplated.

In certain embodiments, the inner opening 314 is configured to provide access to the inner housing 308. For example, the inner opening 314 may provide access to the inner housing 308 so that one or more batteries can be inserted and/or removed from the inner housing 308. In some embodiments, the inner opening 314 may be covered by the battery cover 350 (best seen in FIGS. 3E and 3F). In some embodiments, the lower housing 304-2 may not include the inner opening 314.

In certain embodiments, the outer rim 316 extends around a perimeter of the lower housing 304-2. In some embodiments, the outer rim 316 at least partially protrudes into the inner housing 308 and/or the upper housing 304-1.

FIG. 3C is an enlarged view illustrating the second receptacle 310-2 of the lower housing 304-2 seen in FIG. 3B, according to certain embodiments. The enlarged view of the second receptacle 310-2 may similarly be representative of the first receptacle 310-1 and the third receptacle 310-3. In FIG. 3C, the second receptacle 310-2 includes a base surface 330, an aperture 334 in the base surface 330, and a plurality of walls, a first wall 332-1 and a second wall 332-2.

In certain embodiments, the base surface 330 is configured to form a barrier between the second magnet 312-2 and the exterior surface 322 of the lower housing 304-2. In some embodiments, the base surface 330 and the aperture 334 are circular. Although the base surface 330 and the aperture 334 are circular, the base surface 330 and/or the aperture 334 may be rectangular, triangular, or any other suitable shape.

In certain embodiments, the first wall 332-1 and the second wall 332-2 partially surround the base surface 330 to form the second receptacle 310-2. In some embodiments, the first wall 332-1 and the second wall 332-2 are equal in length and symmetric across opposing sides of the base surface 330. In certain embodiments, the first wall 332-1 and the second wall 332-2 may have a height equal to or greater than a height of a magnet disposed within the second receptacle 310-2. In some embodiments, the first wall 332-1 and the second wall 332-2 are asymmetric and/or unequal in length.

Figure 3D:
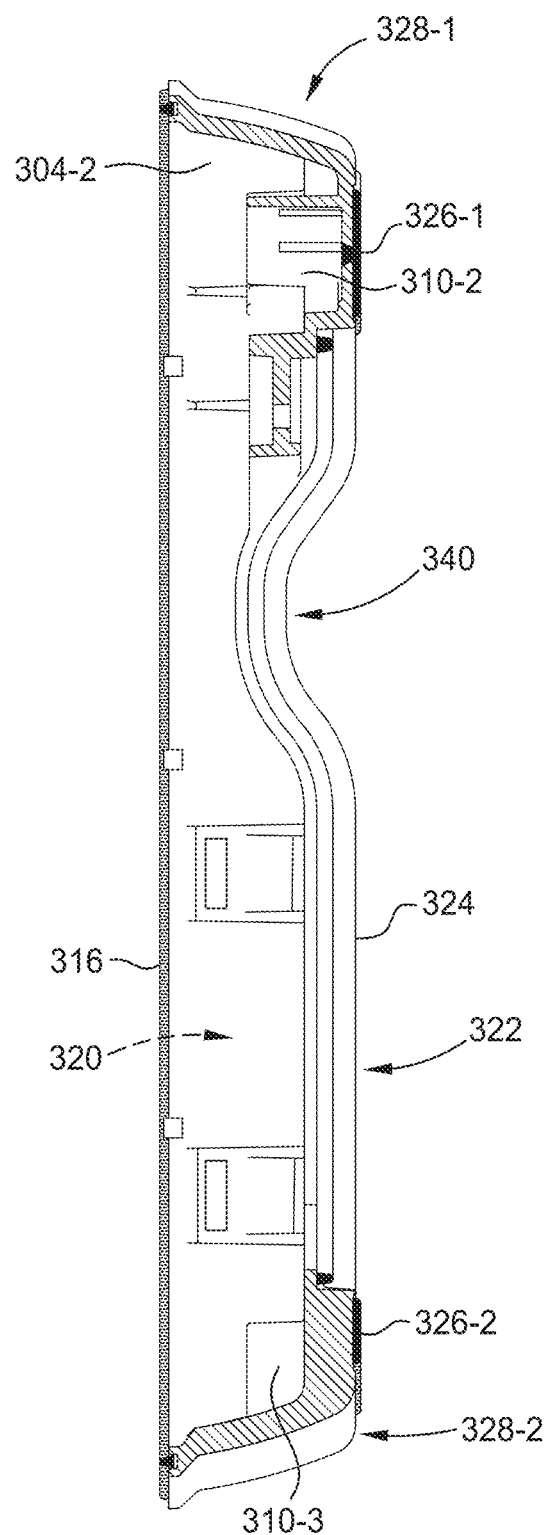
FIG. 3D is a side view illustrating the lower housing seen in FIGS. 3A and 3B, according to certain embodiments.

FIG. 3D is a side view illustrating the lower housing 304-2 seen in FIGS. 3A and 3B, according to certain embodiments. As best seen in FIG. 3D, the lower housing 304-2 includes an underside gripping portion 340 on the exterior surface 322.

In FIG. 3D, the first elastomeric pad 326-1 is positioned at the first end 328-1 and the second elastomeric pad 326-2 is positioned at the second end 328-2. In some embodiments, the first elastomeric pad 326-1 aligns with the first receptacle 310-1 and the second receptacle 310-2 at the first end 328-1, and the second elastomeric pad 326-2 aligns with the third receptacle 310-3. As such, the first elastomeric pad 326-1 and the second elastomeric pad 326-2 correspond to the positioning of the magnets disposed within the wireless remote 300. The positioning of the elastomeric pads 326-1 and 326-2 are described in further detail with reference to FIG. 3F.

Figure 3E:
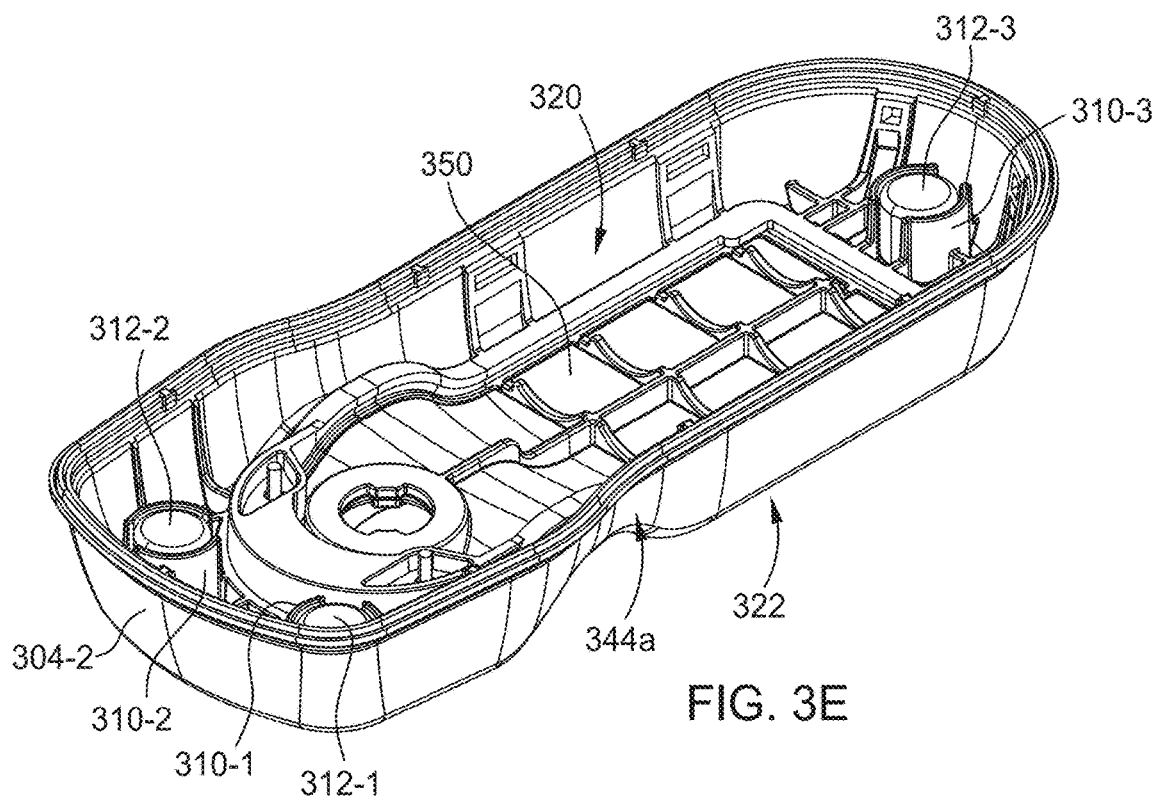
FIG. 3E is a top side isometric view illustrating the lower housing, battery cover, and magnets of the wireless remote seen in FIG. 3A, according to certain embodiments.

FIG. 3E is a top side isometric view illustrating the lower housing 304-2, the battery cover 350, and the magnets 312-1, 312-2, and 312-3 of the wireless remote 300 seen in FIG. 3A, according to certain embodiments. In FIG. 3E, the magnets 312-1, 312-2, and 312-3 are disposed within the receptacles 310-1, 310-2, and 310-3 in the inner portion 320 of the lower housing 304-2. In certain embodiments, the magnets 312-1, 312-2, and 312-3 may be press fit into the receptacles 310-1, 310-2, and 310-3 or held in the receptacles 310-1, 310-2, and 310-3 by glue, a screw, or other suitable coupling mechanism.

The lower housing 304-2 also includes a left side gripping portion 344a shown in FIG. 3E. The left side gripping portion 344a may be similar to left side gripping portion 208-2a described with reference to FIG. 2A.

Figure 3F:
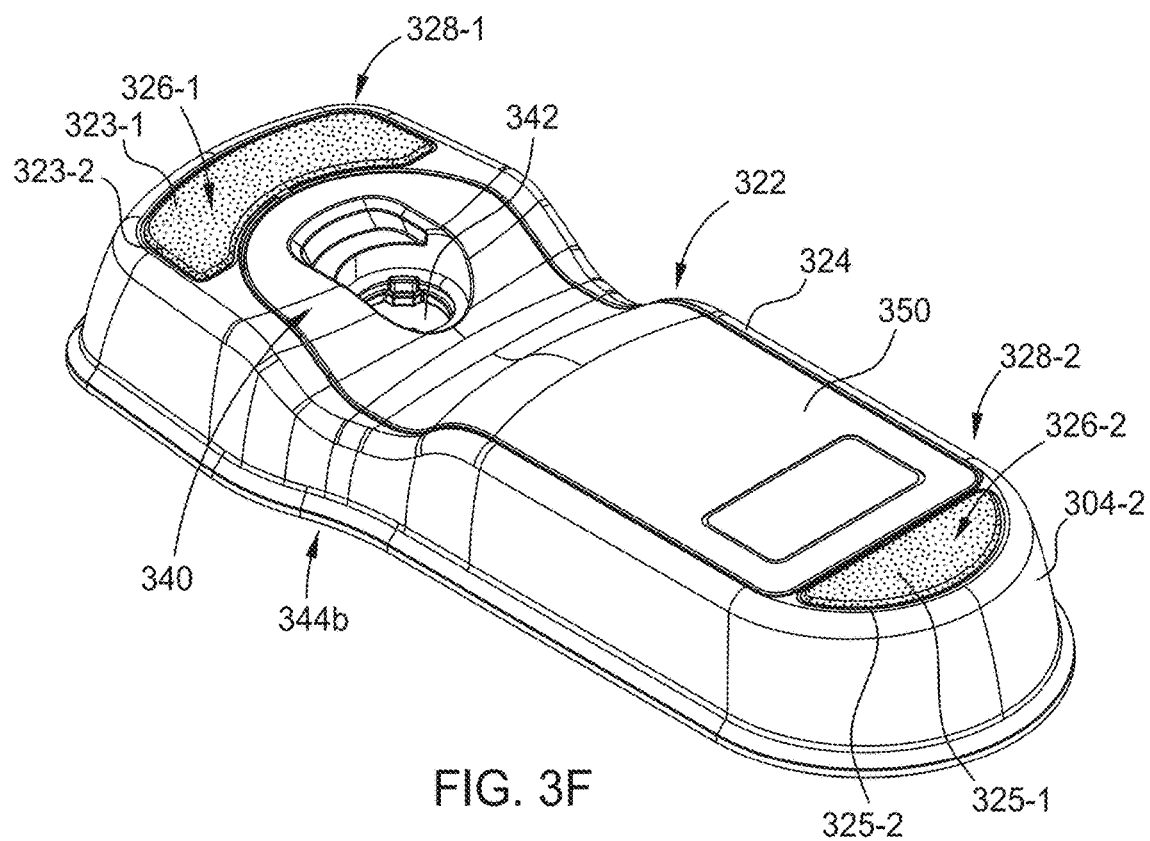
FIG. 3F is a bottom side isometric view illustrating the lower housing, battery cover, and elastomeric pads of the wireless remote seen in FIG. 3A, according to certain embodiments.

FIG. 3F is a bottom side isometric view illustrating the lower housing 304-2, the battery cover 350, and the elastomeric pads 326-1 and 326-2 of the wireless remote 300 seen in FIG. 3A, according to certain embodiments. In FIG. 3F, the first elastomeric pad 326-1 is positioned at the first end 328-1 of the lower housing 304-2, and the second elastomeric pad 326-2 is positioned at the second end 328-2 of the lower housing 304-2.

In certain embodiments, the first elastomeric pad 326-1 corresponds to a positioning of the magnets at the first end 328-1. For example, the first elastomeric pad 326-1 includes two circular portions corresponding to the first magnet 312-1 and the second magnet 312-2 with a bridging portion between the two circular portions. In some embodiments, the first elastomeric pad 326-1 may include a first planar surface 323-1 for contacting the instrument surface 112 (FIG. 1) and a second tapered surface 323-2 that defines a perimeter of the first elastomeric pad 326-1. In certain embodiments, the first elastomeric pad 326-1 has a minimum width of 1.50 inches (in) and a minimum length of 0.655 in.

In certain embodiments, the second elastomeric pad 326-2 corresponds to a positioning of the magnet(s) at the second end 328-2. For example, the second elastomeric pad 326-2 includes one circular portion corresponding to the third magnet 312-3 and wing portions extending radially therefrom. In some embodiments, the second elastomeric pad 326-2 may include a first planar surface 325-1 for contacting the instrument surface 112 (FIG. 1) and a second tapered surface 325-2 that defines a perimeter of the second elastomeric pad 326-2. In certain embodiments, the second elastomeric pad 326-2 has a minimum width of 1.45 in and a minimum length of 0.464 in.

In some embodiments, the elastomeric pads 326-1 and 326-2 have a thickness that permits magnetic coupling of the wireless remote 300 to the tray 400 (FIG. 4), while still preventing the wireless remote 300 from sliding around on the tray 400. In certain embodiments, the elastomeric pads may have a thickness within a range of 0.064 mm and 0.089 mm (e.g., within 0.062 mm and 0.087 mm, 0.060 mm and 0.085 mm, 0.058 mm and 0.083 mm, or 0.056 mm and 0.081 mm).

Although the elastomeric pads 326-1 and 326-2 are described as having particular shapes and dimensions, the elastomeric pads 326-1 and 326-2 are not limited to such shapes and/or dimensions. The elastomeric pads 326-1 and 326-2 may also be positioned differently on the exterior surface 324 of the lower housing 304-2. Further, there may be more than two elastomeric pads or only one elastomeric pad on the exterior surface 324 of the lower housing 304-2.

In certain embodiments, the battery cover 350 includes an aperture 342. As an example, the aperture 342 is configured to allow a fastener (e.g., fastener 212 in FIG. 2B) to extend therethrough and couple the battery cover 350 to the wireless remote 300. In some embodiments, the aperture 342 provides a "twist-and-lock" mechanism for the fastener to couple the battery cover 350 to the wireless remote 300.

The lower housing 304-2 also includes a right-side gripping portion 344b shown in FIG. 3E. The right-side gripping portion 344b may be similar to right-side gripping portion 208-2b described with reference to FIG. 2A.

An example of a tray on which the wireless remote 200 or 300 may be placed is described in further detail with reference to FIGS. 4 and 5A-5B.

Figure 4:
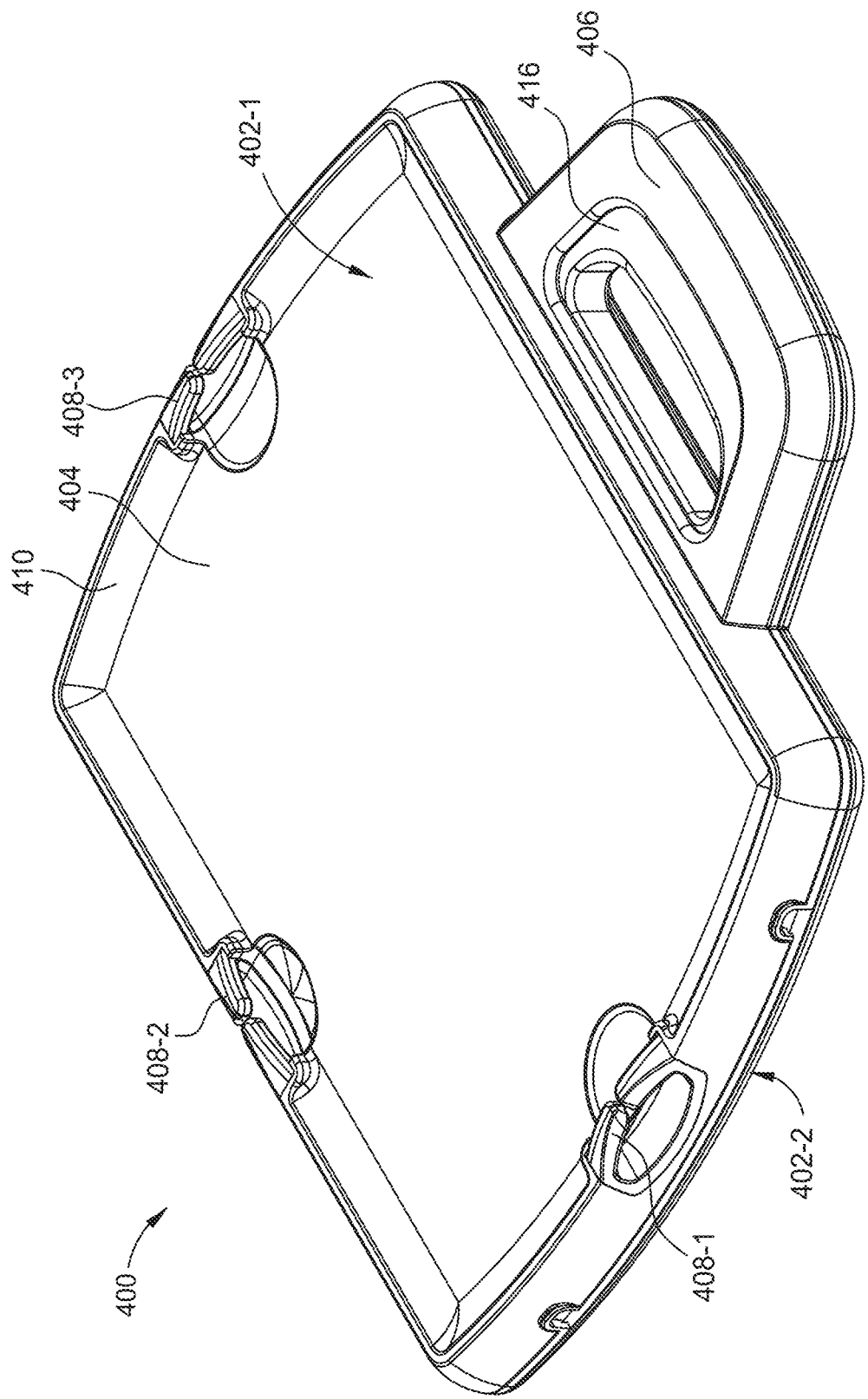
FIG. 4 is a top side isometric view illustrating an example tray, according to certain embodiments.

FIG. 4 is a top side isometric view illustrating an example tray 400, according to certain embodiments. The tray 400 may represent an embodiment of the tray 102 shown in FIG. 1. In FIG. 4, the tray 400 includes an upper casing 402-1 with an instrument surface 404 and an outer lip 410, a lower casing 402-2, and a tray positioning handle 406 with a release handle 416. In certain embodiments, the lower casing 402-2 is coupled to the upper casing 402-1 and encloses a magnetically attractive layer, which is described in further detail with reference to FIGS. 5A and 5B.

In certain embodiments, the instrument surface 404 is configured to hold instruments, tools, and other devices used during surgical procedures. For example, the instrument surface 404 may be configured to hold remotes (e.g., wireless remotes), vitrectomy probes, phacoemulsification probes, etc. In some embodiments, the instrument surface 404 is bordered by the outer lip 410 to prevent the instruments and other devices from falling off the tray 400 during surgical procedures.

In certain embodiments, the instrument surface 404 is a planar, rectangular-like surface with a minimum width of 15 in and a minimum length of 9 in. In some embodiments, two edges of the instrument surface 404 are linear and parallel to each other, and another two edges of the instrument surface 404 are semi-circular and oppose each other. Although the instrument surface 404 is shown as an even, planar surface, the instrument surface 404 may be uneven, such that certain portions of the instrument surface 404 may be recessed to hold certain instruments. Further, the instrument surface 404 may be circular, rectangular, or any other suitable shape.

In certain embodiments, the outer lip 410 protrudes from the instrument surface 404. For example, an inner surface of the outer lip 410 curves outward from the instrument surface 404. In some embodiments, an outer surface of the outer lip 410 curves outward to connect the upper casing 402-1 to the lower casing 402-2. In some embodiments, the outer lip has a height between 0.5 in and 2.0 in (e.g., between 0.6 in and 1.9 in, 0.7 in and 1.8 in, 0.8 in and 1.7 in, or 0.9 in and 1.6 in).

In certain embodiments, a plurality of clips, a first clip 408-1, a second clip 408-2, and a third clip 408-3 may be disposed along corresponding edges of the upper casing 402-1. In some embodiments, the clips 408-1, 408-2, and 408-3 are disposed through the outer lip 410 of the upper casing 402-1. The clips 408-1, 408-2, and 408-3 may include two flexible prongs disposed inwards towards each other, with a gap between the two prongs. As an example, the clips 408-1, 408-2, and 408-3 are configured to hold cables and/or tubes connected to instruments placed on tray 400 during procedures for cable and tube management purposes. Although the tray 400 is shown as including three clips 408-1, 408-2, and 408-3, the tray 400 may include more than three or less than three clips disposed in different or similar positions on the upper casing 402-1.

In certain embodiments, the tray positioning handle 406 is configured to allow a user to move the tray 400 when attached to a surgical console via upper arm assembly 104 (FIG. 1). In some embodiments, the tray positioning handle 406 includes a release handle 416 that is configured to release the tray 400 from the upper arm assembly 104 (FIG. 1). In some embodiments, the tray 400 may include buttons and/or inputs configured to control the surgical console and/or configured to move the tray 400 relative to the surgical console.

Figure 5A:
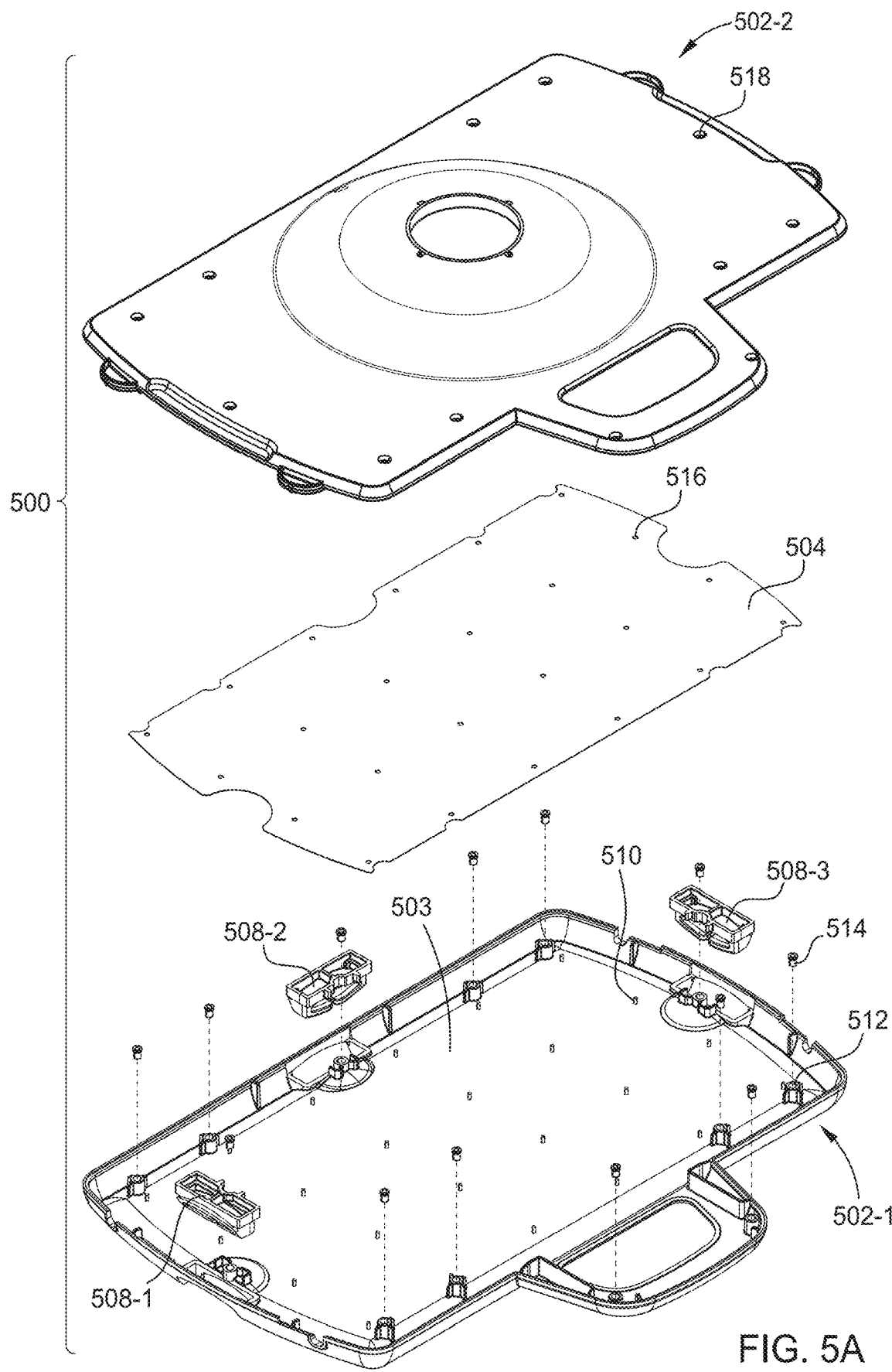
FIG. 5A is an exploded isometric view of the tray seen in FIG. 4, according to certain embodiments.

FIG. 5A is an exploded isometric view of the tray 400 seen in FIG. 4, according to certain embodiments. In FIG. 5A, tray 500, which represents an embodiment of tray 400, is shown from a bottom isometric view. In certain embodiments, the tray 500 includes an upper casing 502-1, a lower casing 502-2, and a magnetically attractive layer 504 disposed within the tray 500 between the upper casing 502-1 and the lower casing 502-2.

In certain embodiments, the upper casing 502-1 includes a plurality of posts 510 (one labeled for clarity purposes) protruding from an interior surface 503. As an example, the plurality of posts 510 may protrude through a plurality of apertures 516 (one labeled for clarity purposes) in the magnetically attractive layer 504. In certain embodiments, the posts 510 may be ultrasonically staked to dispose the magnetically attractive layer 504 against the interior surface 503 of the upper casing 502-1 (best seen in FIG. 5B). As an example, the upper casing 502-1 may include four rows of six posts that correspond with four rows of six apertures in the magnetically attractive layer 504. In some embodiments, the upper casing 502-1 and/or the magnetically attractive layer 504 may also include a different number of posts and apertures in a different or similar arrangement.

In certain embodiments, the magnetically attractive layer 504 is configured for magnetically coupling the wireless remote (e.g., wireless remote 200 and/or 300) to the instrument surface 404 (FIG. 4). In some embodiments, the wireless remote 200 or 300 may be magnetically coupled anywhere on the instrument surface 404. Although the tray 500 includes the magnetically attractive layer 504, the tray 500 is not magnetized. As such, the tray 500 does not magnetically couple to other metal instruments.

In certain embodiments, the magnetically attractive layer 504 may be a magnetic sheet may be a ferrous sheet, steel sheet, or other similar magnetic sheet. In some embodiments, the magnetically attractive layer 504 may have a minimum width of 15 in, a minimum length of 9 in, and a minimum thickness of 0.0175 in. In exemplary embodiments, a galvanized magnetically attractive layer has a minimum thickness of 0.0187 in and a zinc plated cold rolled steel (CRS) magnetically attractive layer has a minimum thickness of 0.0179 in. The magnetically attractive layer 504 may be galvanized or otherwise plated or coated for corrosion prevention purposes.

In certain embodiments, a plurality of clips, a first clip 508-1, a second clip 508-2, and a third clip 508-3 may be disposed along corresponding edges of the upper casing 502-1. In some embodiments, the clips 508-1, 508-2, and 508-3 may be as described with reference to clips 408-1, 408-2, and 408-3 in FIG. 4. Although the tray 500 is shown as including three clips 508-1, 508-2, and 508-3, the tray 500 may include more than three or less than three clips disposed in different or similar positions on the upper casing 502-1.

In certain embodiments, a plurality of coupling slots 512 (one labeled for clarity purposes) are disposed on the interior surface 503 of the upper casing 502-1. The plurality of coupling slots may be configured to receive a pin 514 (one labeled for clarity purposes) to couple the upper casing 502-1 to the lower casing 502-2. For example, the pins 514 and the coupling slots 512 may each be threaded, such that the pins 514 are screwed into the coupling slots 512. As such, the pins 514 may be disposed through casing apertures 518 and threaded into the coupling slots 512 to couple the upper casing 502-1 to the lower casing 502-2.

In some embodiments, the upper casing 502-1 and the lower casing 502-2 may include eight coupling slots 512 and eight pins 514, such that four coupling slots are positioned along one edge of the interior surface 503 and another four coupling slots are disposed along an opposing edge of the interior surface 503. Although the tray is described as including eight coupling slots on the upper casing 502-1 and eight coupling slots on the lower casing 502-2 in a certain arrangement, the tray 500 may include more than eight or less than eight coupling slots on the upper casing 502-1 and the lower casing 502-2 in a different arrangement.

Figure 5B:
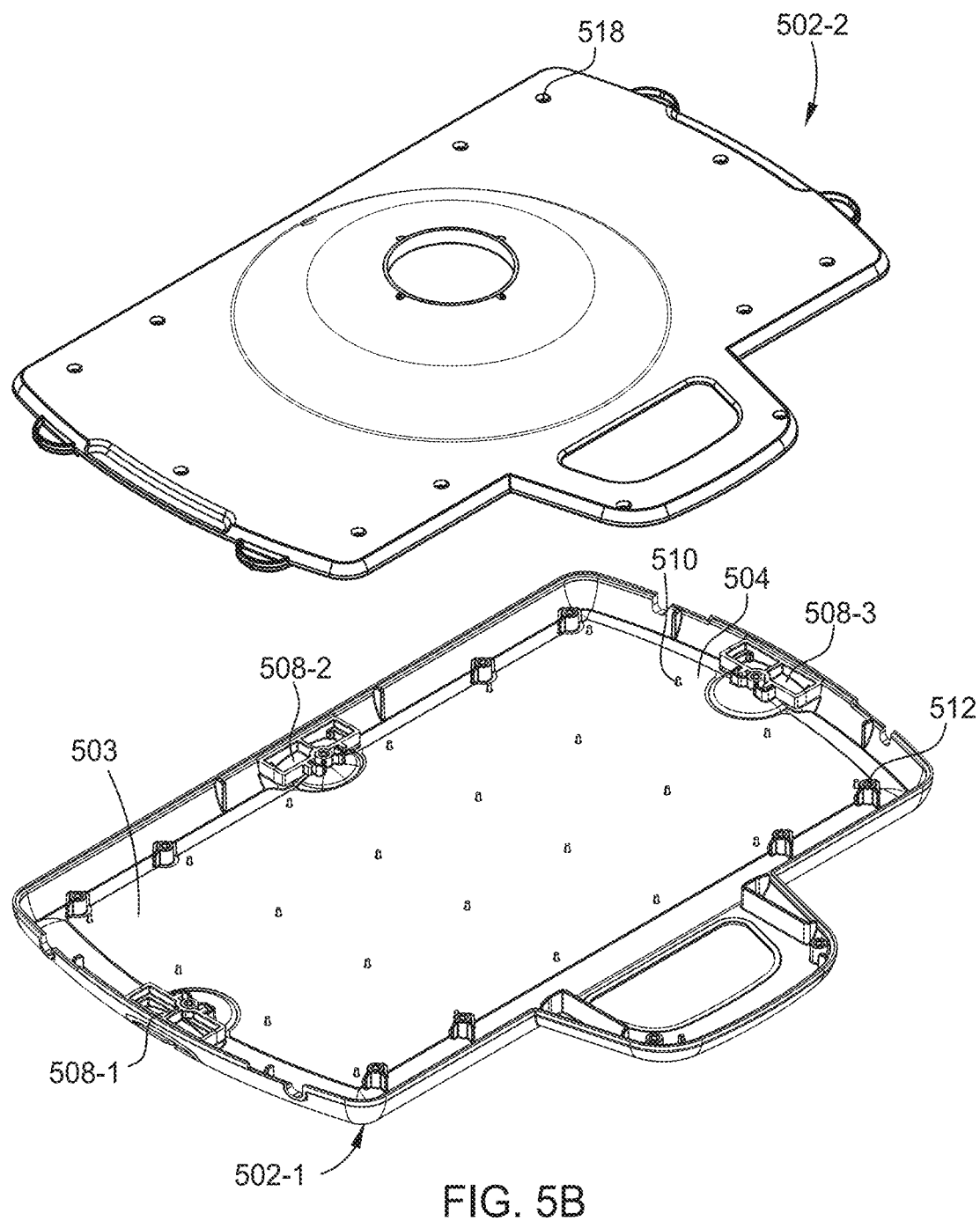
FIG. 5B is another exploded isometric view of the tray seen in FIG. 4, according to certain embodiments.

FIG. 5B is another exploded isometric view of the tray 500 seen in FIG. 5A, according to certain embodiments. In FIG. 5B, the magnetically attractive layer 504 is shown as being disposed against the interior surface 503 of the upper casing 502-1. In certain embodiments, the magnetically attractive layer 504 is disposed against the interior surface 503 via the ultrasonically staked posts 510.

Although the magnetically attractive layer 504 is shown as covering nearly an entire area of the interior surface 503, which corresponds to the instrument surface 404, the magnetically attractive layer 504 may also cover a portion of the interior surface 503. For example, the magnetically attractive layer 504 may cover half of the interior surface 503, a third of the interior surface 503, or a quarter of the interior surface 503. Further, the magnetically attractive layer 504 may be positioned along one edge of the interior surface 503 or in a corner of the interior surface 503. In some embodiments, there may be more than one magnetically attractive layer, such that one magnetically attractive layer may cover a portion of the interior surface 503 and another magnetically attractive layer may cover another portion of the interior surface 503.

The present disclosure may be embodied in other specific forms without departing from its spirit or essential characteristics. The described embodiments are to be considered in all respects only as illustrative and not restrictive. The scope of the present disclosure is, therefore, indicated by the appended Claims rather than by this Detailed Description. All changes which come within the meaning and range of equivalency of the Claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the present disclosure.

Reference throughout this specification to "one embodiment", "an embodiment", or similar language means that a particular feature, structure, or characteristic described in connection with the indicated embodiment is included in at least one embodiment of the present disclosure. Thus, the phrases "in one embodiment", "in an embodiment", and similar language throughout this specification may, but do not necessarily, all refer to the same embodiment.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments may fall within the scope of the appended claims.

Example Embodiments

Embodiment 1: A wireless remote for ophthalmic surgical operations, the wireless remote comprising: electronics configured to wirelessly control one or more aspects associated with operations of an ophthalmic surgical console; and one or more magnets configured to magnetically couple the wireless remote to a surgical tray of the ophthalmic surgical console.

Embodiment 2: The wireless remote of Embodiment 1, wherein the wireless remote comprises one or more receptacles disposed within the wireless remote, and wherein the one or more magnets are disposed within the one or more receptacles.

Embodiment 3: The wireless remote of Embodiment 2, wherein the one or more receptacles comprise three receptacles arranged in a triangular shape within the wireless remote.

Embodiment 4: The wireless remote of Embodiment 2, wherein the one or more receptacles comprise: a first receptacle at a first end of the wireless remote; a second receptacle horizontally aligned with the first receptacle at the first end of the wireless remote; and a third receptacle at a second end of the wireless remote.

Embodiment 5: The wireless remote of Embodiment 1, wherein the wireless remote further comprises one or more elastomeric pads configured to maintain positioning of the wireless remote on the surgical tray at a user-determined location.

Embodiment 6: The wireless remote of Embodiment 5, wherein a position of the one or more elastomeric pads corresponds to a position of the one or more magnets disposed within the wireless remote.

Embodiment 7: The wireless remote of Embodiment 5, wherein the one or more elastomeric pads comprise: a first elastomeric pad at a first end of the wireless remote; and a second elastomeric pad at a second end of the wireless remote.

Embodiment 8: The wireless remote of Embodiment 5, wherein the one or more elastomeric pads comprise: a first planar surface for contacting the tray; and a second tapered surface that defines a perimeter of the one or more elastomeric pads.

Embodiment 9: The wireless remote of Embodiment 5, wherein a thickness of the one or more elastomeric pads permits magnetic coupling of the wireless remote to the tray.

Embodiment 10: The wireless remote of Embodiment 1, wherein the wireless remote comprises one or more inputs for controlling the one or more aspects of the surgical console, and wherein the one or more inputs comprise at least one of: a button; a gyroscope; a trackpad; and a touchscreen.

Embodiment 11: A wireless remote for ophthalmic surgical operations, the wireless remote comprising: electronics configured to wirelessly control one or more aspects associated with operations of an ophthalmic surgical console; one or more magnets disposed in one or more receptacles of the wireless remote, wherein the one or more magnets are configured to magnetically interact with a magnetically attractive layer of a surgical tray of the ophthalmic surgical console and couple the wireless remote to the surgical tray; and one or more elastomeric pads aligned with the one or more magnets, wherein the one or more elastomeric pads are configured to maintain a position of the wireless remote on the tray.

While the foregoing is directed to embodiments of the present disclosure, other and further embodiments of the disclosure may be devised without departing from the basic scope thereof, and the scope thereof is determined by the claims that follow.

What is claimed is:

1. A system, the system comprising:
a tray comprising a magnetically attractive layer; and
a wireless remote configured to control one or more aspects associated with operations of a surgical console, the wireless remote comprising one or more magnets configured to magnetically interact with the magnetically attractive layer and couple the wireless remote to the tray.

2. The system of claim 1, wherein the wireless remote comprises:
one or more receptacles disposed within the wireless remote, and
wherein the one or more magnets are disposed within the one or more receptacles.

3. The system of claim 2, wherein the one or more receptacles comprise three receptacles arranged in a triangular shape within the wireless remote.

4. The system of claim 2, wherein the one or more receptacles comprise:
a first receptacle at a first end of the wireless remote;
a second receptacle horizontally aligned with the first receptacle at the first end of the wireless remote; and
a third receptacle at a second end of the wireless remote.

5. The system of claim 1, wherein:
the wireless remote further comprises one or more elastomeric pads configured to maintain positioning of the wireless remote on the tray at a user-determined location.

6. The system of claim 5, wherein a positioning of the one or more elastomeric pads corresponds to a positioning of the one or more magnets disposed within the wireless remote.

7. The system of claim 5, wherein the one or more elastomeric pads comprise:
a first elastomeric pad at a first end of the wireless remote; and
a second elastomeric pad at a second end of the wireless remote.

8. The system of claim 5, wherein the one or more elastomeric pads comprise:
a first planar surface for contacting the tray; and
a second tapered surface that defines a perimeter of the one or more elastomeric pads.

9. The system of claim 5, wherein a thickness of the one or more elastomeric pads permits magnetic coupling of the wireless remote to the tray.

10. The system of claim 1, wherein:
the tray comprises:
an upper casing; and
a lower casing coupled to the upper casing, and
the magnetically attractive layer is disposed between the upper casing and the lower casing against an interior surface of the upper casing.

11. The system of claim 10, wherein the magnetically attractive layer is coupled to the interior surface of the upper casing by a plurality of posts extending from the interior surface of the upper casing through a plurality of apertures in the magnetically attractive layer.

12. The system of claim 11, wherein the posts are ultrasonically staked to dispose the magnetically attractive layer against the interior surface of the upper casing.

13. The system of claim 1, wherein the wireless remote has one or more inputs for controlling the one or more aspects of the surgical console, and wherein the one or more inputs comprise at least one of:
a button;
a gyroscope;
a trackpad; and
a touchscreen.

14. The system of claim 1, wherein the magnetically attractive layer is a galvanized magnetically attractive layer or a zinc plated cold rolled steel (CRS) magnetically attractive layer.

15. A surgical console, the surgical console comprising:
a tray comprising a magnetically attractive layer; and
a wireless remote configured to control one or more aspects associated with operations of the surgical console, the wireless remote comprising:
one or more magnets disposed in one or more receptacles,
wherein the one or more magnets are configured to magnetically interact with the magnetically attractive layer and couple the wireless remote to the tray; and
one or more elastomeric pads aligned with the one or more magnets,
wherein the one or more elastomeric pads are configured to maintain positioning of the wireless remote on the tray.

* * * * *